(No Model.) 2 Sheets—Sheet 1.

H. SCOTT.
MEASURING INSTRUMENT.

No. 576,900. Patented Feb. 9, 1897.

WITNESSES: INVENTOR
  H. Scott.
BY
ATTORNEYS.

(No Model.) 2 Sheets—Sheet 2.
H. SCOTT.
MEASURING INSTRUMENT.

No. 576,900. Patented Feb. 9, 1897.

WITNESSES:

INVENTOR
H. Scott.
BY
ATTORNEYS.

UNITED STATES PATENT OFFICE.

HERCULES SCOTT, OF PRINCETON, WEST VIRGINIA.

MEASURING INSTRUMENT.

SPECIFICATION forming part of Letters Patent No. 576,900, dated February 9, 1897.

Application filed May 9, 1896. Serial No. 590,842. (No model.)

*To all whom it may concern:*

Be it known that I, HERCULES SCOTT, of Princeton, in the county of Mercer and State of West Virginia, have invented a new and Improved Measuring Instrument, of which the following is a full, clear, and exact description.

The object of the invention is to provide a new and improved measuring instrument which is simple and durable in construction and more especially designed for conveniently measuring the area of plots of land, but adapted also for conveniently measuring the distance between objects, the heights of objects, &c.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
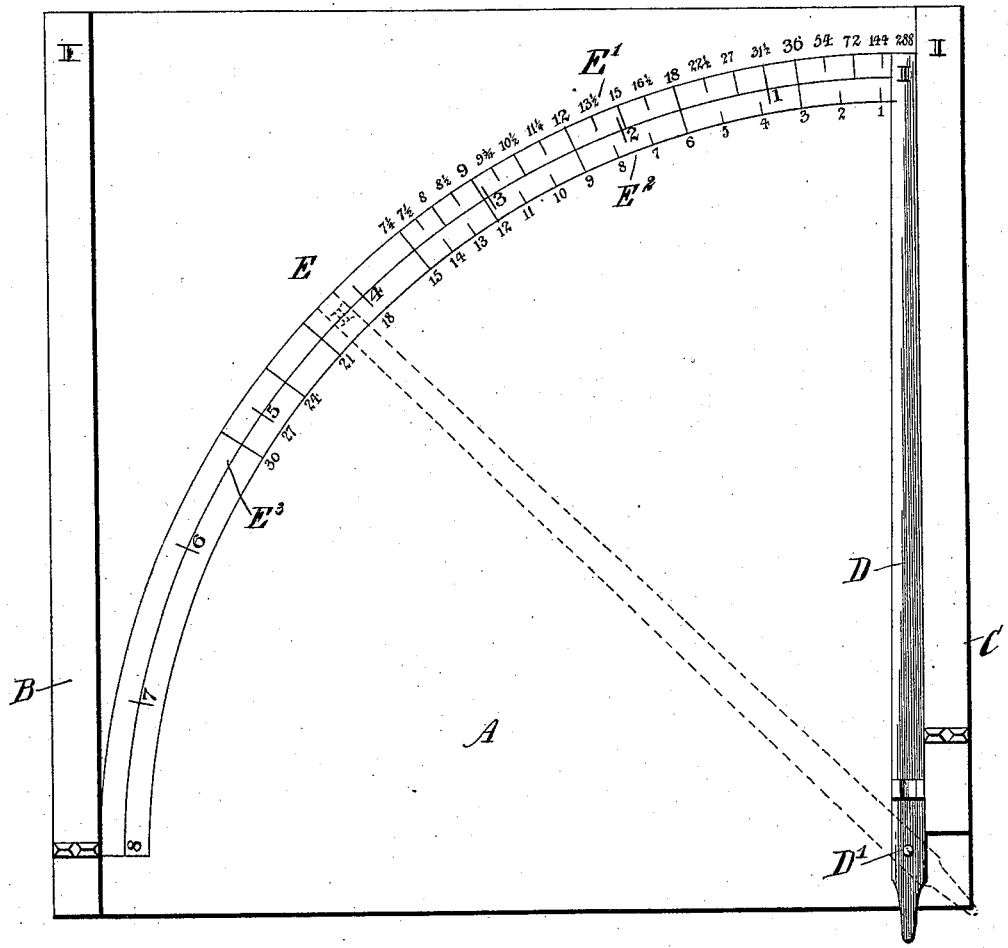
Figure 2:
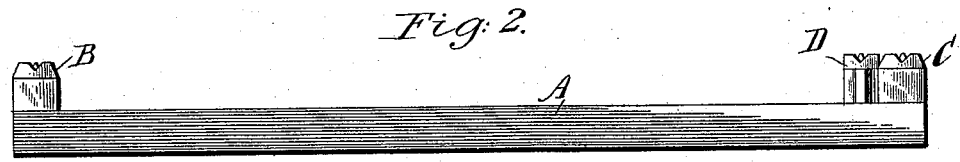
Figure 3:
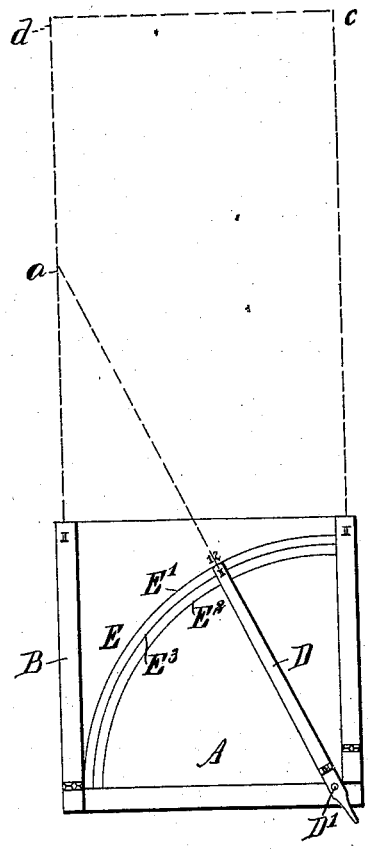
Figure 5:
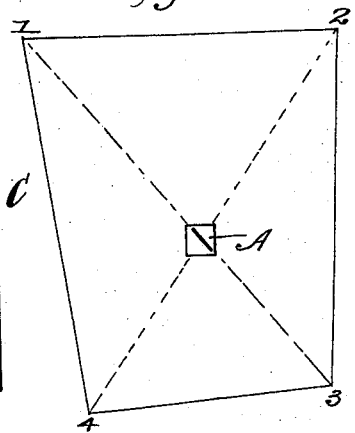
Figure 4:
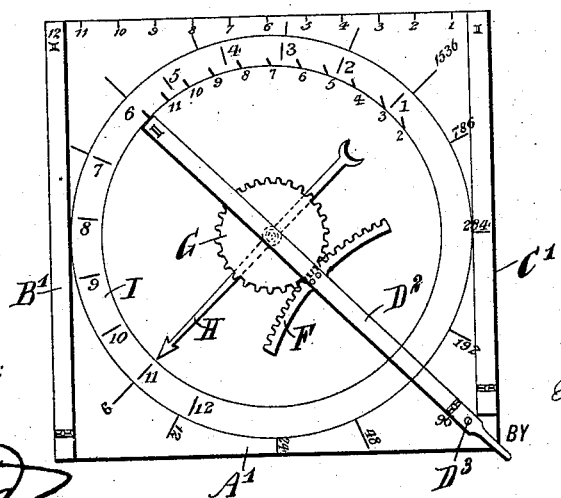

Figure 1 is a plan view of the improvement. Fig. 2 is an end elevation of the same. Fig. 3 is a reduced plan view of the same as applied. Fig. 4 is a plan view of a modified form of the improvement, and Fig. 5 is a diagram illustrating one mode of using the instrument.

The improved measuring instrument is provided with a table A, from the base-line of which extend at right angles the two sights B and C, arranged parallel one to the other and at or near the outer edges of the table A, as plainly indicated in Fig. 1. An arm D, formed on its top with sights, is fulcrumed at D' on the table A near the sight C, the fulcrum D' of the said arm being arranged in the base-line of the table—that is, at right angles to the base of the sight B.

The free end of the arm D is adapted to indicate on a graduation E, formed with scales of linear measurement E' $E^2$ $E^3$, of which the scale E' indicates linear measurement for the distance between the instrument and a distant object. The scale $E^2$ indicates the distance between two objects located at equal distances from the instrument for an arbitrarily-selected normal distance of said objects from the instrument, and the scale $E^3$ serves for indicating the distance between the objects or corners in the measurement of plots of land, as hereinafter more fully described.

The scale E' is arranged or calculated according to the length of the sight B, and consequently when it is desired to find the distance of an object $a$ from the base of the sight B the operator places the table A in such a position as to sight the object $a$ over the sight B, and then while the table is stationary he swings the arm D and sights over this arm the same object $a$ and then reads the distance on the graduation E'. For instance, as shown in Fig. 3, the length of the sight B is six feet and the object $a$ is located a distance from the base of the sight of twelve feet, as indicated by the arm D on the scale E'. When it is desired to measure the distance between two distant objects $c$ $d$, (see Fig. 3,) then the operator places the table A in such a position that he can sight the object $c$ over the said sight C and then moves the arm until it coincides with the object $d$ and then reads on the scale $E^2$ the distance between the two objects $c$ $d$, provided each of said objects is at the "normal" distance from the instrument, as above referred to. If they are not, the distance of each object from the instrument must be ascertained first, as hereinbefore described, and in case both objects should be at equal distances from the instrument the reading on the scale $E^2$ will have to be corrected by a simple multiplication. Should the distances, however, be unequal, a more complex numerical operation will be necessary, which, however, presents no particular difficulty, as it merely amounts to finding the third side of a triangle of which two sides and the angle inclosed between them are known.

From the foregoing it will be seen that the instrument can be readily used for calculating the size of a plot of land, provided the table A can be located on the land in such a manner that the operator can reach with the several sights the corners of the plot of land. The operator then sights each corner with the sight B, measures the distance thereto from the instrument, so as to obtain the outline of the piece of land and the distance between the corners to enable him to calculate the area.

When the instrument is placed as near as may be in the center of the plot, then take the distance to corner No. 1, say 8, to corner No. 2, also 8, average distance 8; then sight bar C, as shown in Fig. 3, to corner marked 2; then move the arm D until it sights corner No. 1, and read in the middle scale "$4\frac{1}{2}$," as shown by the movable arm in middle scale; then $8 \times 4\frac{1}{2} = 36 \div 6 = 6$, the distance from corner 1 to 2; but if corner No. 1 be 12 and No. 2 be 8 the average distance will be 10, and as corner 1 is one-half longer distance than No. 2 we add one-half to the multiplier; then $10 \times 5 = 50 \div 6 = 8\frac{1}{3}$, distance from 1 to 2. Use arm D on middle scale in each case in measuring plots of land or distances apart of two objects.

I have assumed in the above example that the scale $E^3$ is graduated for a normal distance of the objects from the instrument equal to six. Hence with a different distance the indications of said scale must be divided by six and multiplied by the actual distance or the average distance, as above set forth.

In the modified form shown in Fig. 4 the table A' is provided with sights B' C' and with a sight-arm $D^2$, pivoted at $D^3$ to the table, similarly to the arm D on the table A. On the arm $D^2$ is secured a segmental gear-wheel F, in mesh with a gear-wheel G, mounted to turn in the middle of the table A and carrying a pointer H, indicating on a graduation I, similar to the graduation E, above referred to. Now it will be seen that when the arm $D^2$ is moved the segmental gear-wheel F will turn the gear-wheel G to move the pointer H on the graduation I, even should the arm $D^2$ be given more than a quarter-turn. The reading is done in the same way as above described and shown in Fig. 1.

Having thus fully described my invention, I claim as new and desire to secure by Letters Patent—

1. A measuring instrument comprising a table or base, spaced stationary sights arranged to form sight-lines at opposite sides of the table, and a sighting-arm pivoted to the table at the end of one of said sight-lines, substantially as described.

2. A measuring instrument, comprising a table or base, spaced stationary sights arranged at opposite sides of the table and forming two parallel sight-lines, and a sighting-arm pivoted to the table at the end of one of said sight-lines substantially as described.

3. A measuring instrument, comprising a base or table, spaced stationary sights arranged to form sight-lines at opposite sides of the table, and a sighting-arm pivoted to the table at the end of one of said sight-lines, the table being provided with two graduations on which indicates said pivoted arm, one of said graduations indicating the distance of an object sighted on the pivoted arm and on the sight-line at the opposite side of the table to the pivot of said arm, and the other graduation indicating the distance between two objects (for a certain normal distance of said objects from the instrument) when one of said objects is sighted on the pivoted arm and the other on the sight-line which is adjacent to the pivot of said arm, substantially as described.

HERCULES SCOTT.

Witnesses:
A. H. BAROOT,
J. D. DANIEL.